Sept. 11, 1928.
A. BAUMANN ET AL
1,683,591
CLOSED CIRCUIT COOLING FOR ELECTRICAL MACHINES
Filed Sept. 8, 1927
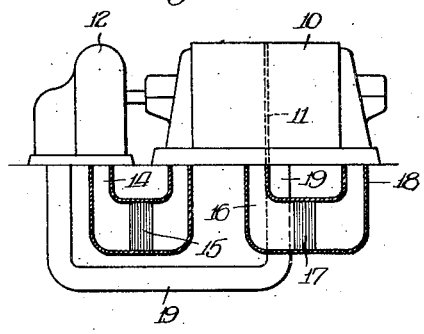
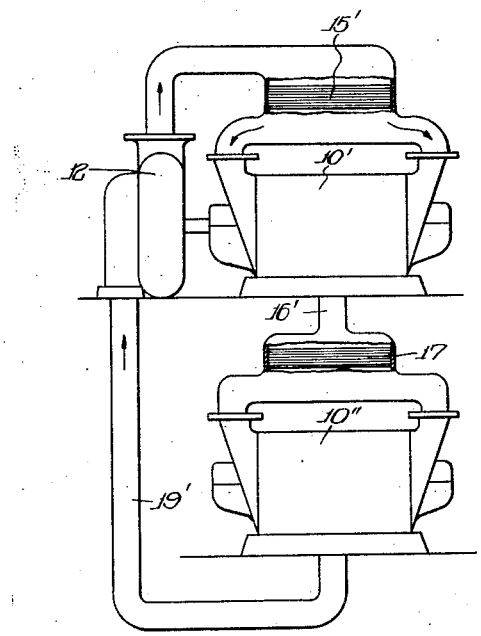
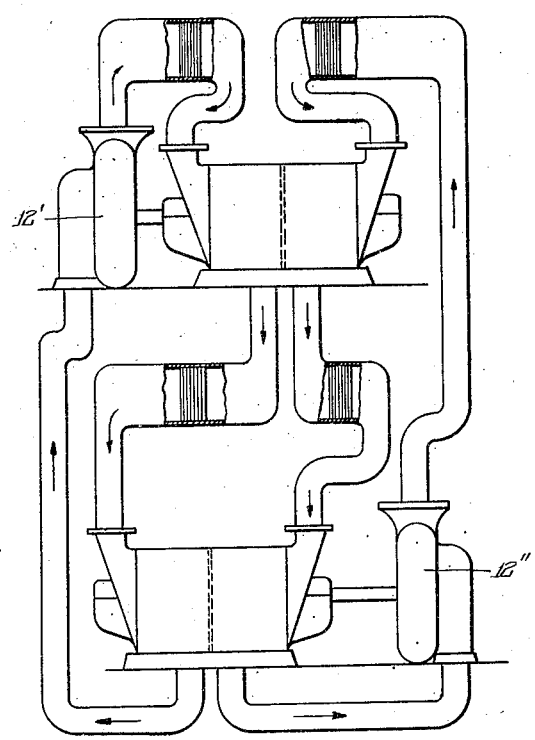

Patented Sept. 11, 1928.

1,683,591

UNITED STATES PATENT OFFICE.

ADOLPH BAUMANN AND WILLEM VAN RIJSWIJK, OF BADEN, SWITZERLAND.

CLOSED-CIRCUIT COOLING FOR ELECTRICAL MACHINES.

Application filed September 8, 1927. Serial No. 218,144, and in Germany August 26, 1926.

This invention relates to electrical apparatus such as large dynamo-electric machines, and has to do with the method and apparatus for cooling the same by means of a gas employed as a circulating medium within a closed circuit cooling system.

The general object of the invention is the provision of an improved method and apparatus for cooling, in which the machine casing or casings may be employed and whereby effective cooling of machines of large size may be effected without involving the use of gas-circulating machines of proportionately large capacity.

A further object is the provision of a method and an apparatus in which the gas-circulating machine or blower may be driven directly from the electrical machine which it serves.

Other and further objects will be pointed out or indicated hereinafter or will appear to one skilled in the art. In the accompanying drawing forming a part of this specification, we show certain structural arrangements in which the invention may be embodied. It is to be understood, however, that these are presented for the purpose of illustration only, and are not to be given any interpretation calculated to limit the claims short of the true and most comprehensive scope of the invention in the art.

In the drawing, Fig. 1 is an elevational view of a dynamo-electric machine with a closed circuit cooling system, portions of the latter being shown in sectional elevation;

Fig. 2 is a diagram illustrating another arrangement embodying the invention; and Fig. 3 is a diagram illustrating a third arrangement of apparatus embodying the invention.

The continually increasing size of electrical machine units, such as dynamo-electric machines, demands larger and larger quantities of air for cooling purposes. The method of supplying cooling air to the machines by closed circuit cooling systems as heretofore employed is not suitable in such large installations where large quantities of circulating medium are required. Hitherto it has been customary to distribute the cooling air in parallel paths over different surfaces of the machine to be cooled. To supply the amount of air requisite for cooling large installations in such fashion, however, requires blowers competent to deliver an extremely large volume at a low pressure, and such a blower is subject to the double disadvantage of requiring a large space for installation and a drive separate from the dynamo electric machine which it serves.

By the present invention, the disadvantages and insufficiencies of the previous arrangement are overcome by an arrangement which enables a blower to be operated with a ratio between pressure and volume which will maintain a high blower efficiency even when high operating speeds are employed. Thus it becomes possible to reduce the size of the blower and to drive it directly from the dynamo electric-machine which it serves.

Described generally, the invention provides for circulating the cooling gas through different portions of the served machine in series, and through intercoolers between such different portions of the machine. Thus, instead of cooling different portions of the machine in parallel with different air streams, they are cooled in series in the same air stream. This arrangement for circulation of the air permits the cooling to be accomplished with a much less volume of air, and requires a higher pressure for the circulation of the air throughout the series path through the different machine portions and intercoolers. A definite quantity of gas passed through a given path within the machine undergoes a temperature rise of, say, $\Delta t$. If $c_p$ is the specified heat of the gas, then the expression $G \cdot c_p \cdot \Delta t$ represents the quantity of heat transferred, where $G$ represents an expression of the quantity of the gas. In a closed circuit cooling system, the heated gas is passed through a cooler where the heat is given out to the circulating water, and the temperature of the gas reduced by $\Delta t$. In the employment of the present invention, the quantity of gas required may be reduced to $1/n$th of that requisite to serve the machine in parallel paths, and this quantity of gas, after traversing $1/n$th of the total length of the cooling paths within the machine and undergoing a rise in temperature of $\Delta t$ (the admissible value), is led out and cooled. Then it is again circulated through another $n$-th of the total path, and again cooled so that, although the weight of gas $G/n$ is only $1/n$th of that required in the comparative instance, the temperature rise $\Delta t$ is the same as that obtained with the larger gas quantity. The series connection of all the cooling paths in the machine and through the coolers, results, of course, in a pressure drop $n$ times as great as in the case of the parallel arrangement, but the theoretical work done, $V \cdot \triangle p$, remains the same, since $V$ is $n$ times smaller and $\triangle p$ is $n$ times greater than before. Thus, by adopting this arrangement, the number of sections of paths connected in series can be chosen so that within a given speed for the blower, which will be determined by the speed of the electrical machine if the blower is direct coupled thereto, the pressure and delivery volume are such as to give the best possible blower efficiency.

Examples of arrangements of apparatus for utilizing the invention are illustrated in the drawing. In Fig. 1, the reference numeral 10 designates generally the casing of the dynamo-electric machine which affords air paths therein about portions of the machine itself. This casing is subdivided by partition 11 into two compartments for circulation of air in contact with portions of the machine. The blower 12 is direct-connected to the dynamo-electric machine, and delivers through a conduit 14 and a cooler 15 to one end of one of the air-directing compartments in the casing 10. The air so introduced cools the machine parts exposed to it, and passes out of the compartment through the conduit 16 to an intercooler 17 wherein it is cooled. From the latter it is passed by conduit 18 into the other compartment within the casing 10, being circulated therein in contact with the machine parts, and issuing therefrom through the conduit 19 by which it is conducted back to the suction side of the blower. The pressure difference of the blower is relied upon to effect the circulation completely through the series path. The machine casing, of course, may be sub-divided into a larger number of sections or compartments, as desired, and intercoolers inserted in the path of the air between successive compartments. In the arrangement illustrated in Fig. 2, the machine casings 10' and 10" constitute separate compartments, the blower 12 supplying air through the cooler 15' to the ends of the compartment 10', the air issuing from the compartment by way of pipe 16', by which it is conducted to the intercooler 17', and thence to the compartment 10", from which it is conducted by way of the conduit 19' back to the suction side of the blower. The circulation through the portions 10' and 10" of the air path is, accordingly, in series, and the total quantity of air in circulation, instead of being that requisite for supplying both path portions simultaneously from the blower, is simply that requisite to effect the displacement of the heated air with sufficient rapidity to hold the heat absorption to the desired value. The arrangement shown in Fig. 3 is one wherein different portions of different machines are served by different circuits, the left hand compartments being served by blower 12' and the right hand compartments being served by blower 12", coolers being arranged in the air path ahead of the first compartments and between the series-connected compartments.

While we have shown the blowers, by way of example, as separate from the casings of the served machines, and driven directly from said machines, it is obvious that the invention is not limited to such arrangements, as the blowers may be separately driven, or they may be arranged within the casings of the dynamo-electric machines. The direct connection of blower to the machine, however, has certain advantages as pointed out above, which advantages the present invention renders available in large installations.

I claim:

1. In electrical apparatus, the combination with a dynamo-electric machine, of a casing therefor subdivided into compartments for guiding cooling fluid in contact with parts of the machine, a conduit connecting said compartments for conducting cooling fluid from one to another in series, an inter-cooler for cooling the fluid incident to its passage from one compartment to another, and means for circulating and recirculating cooling fluid through the series-connected compartments.

2. In electrical apparatus, the combination with a dynamo-electric machine, of a casing therefor having air guiding compartments connected in series, a blower, connections between the blower casing for circulating air through the blower and compartments in series, and coolers in the path of the air between the blower and the casing and betwee the series-connected compartments.

3. In electrical apparatus, the combination with a dynamo-electric machine and a blower having driving connection therewith, of a casing for the machine affording series-connected compartments for guiding cooling air in contact with different parts of the machine, connections for circulating air from the blower through the compartments in series and back to the blower, and coolers for cooling air incident to its passage from one compartment to another.

4. In electrical apparatus, the combination with dynamo-electric apparatus, of casings portions affording separate compartments for guiding cooling air in contact with different portions of the apparatus, connections between said compartments whereby cooling air is passed from one to another in series, a cooler for cooling the air incident to its passage from one compartment to another, a blower, and connections between the same and the casing portions forming therewith a closed circuit for circulation and recirculation of cooling air.

5. In electrical apparatus, the combination with dynamo-electric apparatus, of a blower having driving connection therewith and a closed-circuit path for serving the dynamo-electric apparatus from the blower, said path including casing portions affording series-connected compartments for guiding air in contact with different portions of the dynamo-electric apparatus, and a cooler effective on the air in its passage from one compartment to another.

In testimony whereof we have hereunto subscribed our names this 11 day of August A. D., 1927 at Zurich, Switzerland.

ADOLPH BAUMANN.
WILLEM van RIJSWIJK.